United States Patent Office.

JACOB L. CHEVALIER, OF NEWARK, NEW JERSEY.

Letters Patent No. 69,769, dated October 15, 1867.

IMPROVED COMPOSITION FOR SAUSAGES.

The Schedule referred to in these Letters Patent and making part of the same.

TO ALL WHOM IT MAY CONCERN:

Be it known that I, JACOB L. CHEVALIER, of Newark, in the county of Essex, and State of New Jersey, have made and invented a new Combination of Materials for Sausages; and I do hereby declare that the following is a full, clear, and exact description thereof, which will enable those skilled in the art to make and use the same.

This invention consists in combining fish, either fresh or salted, with pork or lard, and with or without potatoes, for preparing the article of food known as sausages.

I mix these articles about in the following proportions: Fish, uncooked, fresh or salted, ten ounces; pork or lard, six ounces. If potatoes are used the materials may be mixed in the following proportions: Fish, seven ounces; pork or lard, six ounces; potatoes, three ounces. These materials may be chopped or comminuted to the proper degree of fineness, and put in "cases" like those used for ordinary meat sausages.

Having thus described my invention, I claim as new, and desire to secure by Letters Patent—

In the preparation of sausages, the combination of materials herein specified, about in the proportion as set forth.

JACOB L. CHEVALIER.

Witnesses:
    EDMOND CHEVALIER, [L. S.]
    W. S. ROCKHILL. [L. S.]